Jan. 30, 1968        J. H. MIGLIETTA        3,366,577
SULFONATED ADSORBENT AND METHOD OF MANUFACTURE
Filed Oct. 25, 1966                3 Sheets-Sheet 1

INVENTOR.
JOSEPH H. MIGLIETTA
BY
Dayton R. Stemple Jr.
ATTORNEY

United States Patent Office 3,366,577
Patented Jan. 30, 1968

3,366,577
SULFONATED ADSORBENT AND METHOD
OF MANUFACTURE
Joseph H. Miglietta, 4 Lakeview Ave.,
Rouses Point, N.Y. 12979
Continuation-in-part of application Ser. No. 415,905,
Dec. 4, 1964. This application Oct. 25, 1966, Ser.
No. 589,339
6 Claims. (Cl. 252—427)

ABSTRACT OF THE DISCLOSURE

This invention is directed to a sulphonated adsorbent and its method of manufacture in which a catalyst such as manganese sulfate is added to an aqueous suspension of a cellulosic new material such as sawdust and the mixture is heated in a closed vessel to about 160° and the corresponding pressure. Then the heated mixture is acidified with sulphuric acid and further heated to about 174° C. and the corresponding pressure for a predetermined time after which the acid liquor is decanted and the residue is washed with hot water to pH 3.5. The residue is then dispersed in water, passed through a homogenizer and covered with concentrated hydrochloric acid and heated to the boiling point with agitation to form a gel which is washed with hot water to pH 4.0 and dispersed in water to which is added a solution of aluminum sulfate after which calcium hydroxide is added to a pH of 7.0–7.1 and the final product is filtered and rinsed with cold water and will contain approximately 80% moisture.

---

This application is a continuation-in-part of my copending patent application, Ser. No. 415,905 filed Dec. 4, 1964 (now abandoned) which is a continuation-in-part of my patent application Ser. No. 164,612 filed Jan. 5, 1962 (now abandoned).

The invention

This invention relates to a new adsorbent material and its method of manufacture.

It is an important object of the present invention to provide a new adsorbent having an extremely high degree of decolorizing power, and which is easy to use and extremely economical in cost.

It is another object of the instant invention to provide a method of producing an adsorbent of the present invention, which method is extremely simple and economical, can be practiced with a wide variety of inexpensive and readily available raw materials.

Other objects of the present invention will become apparent upon reading the following specification and referring to the accompanying drawings, which form a material part of this disclosure.

The invention accordingly consists in the combinations and arrangements of elements and method steps, which will be exemplified in the following description and of which the scope will be indicated by the appended claims.

Figure 1:
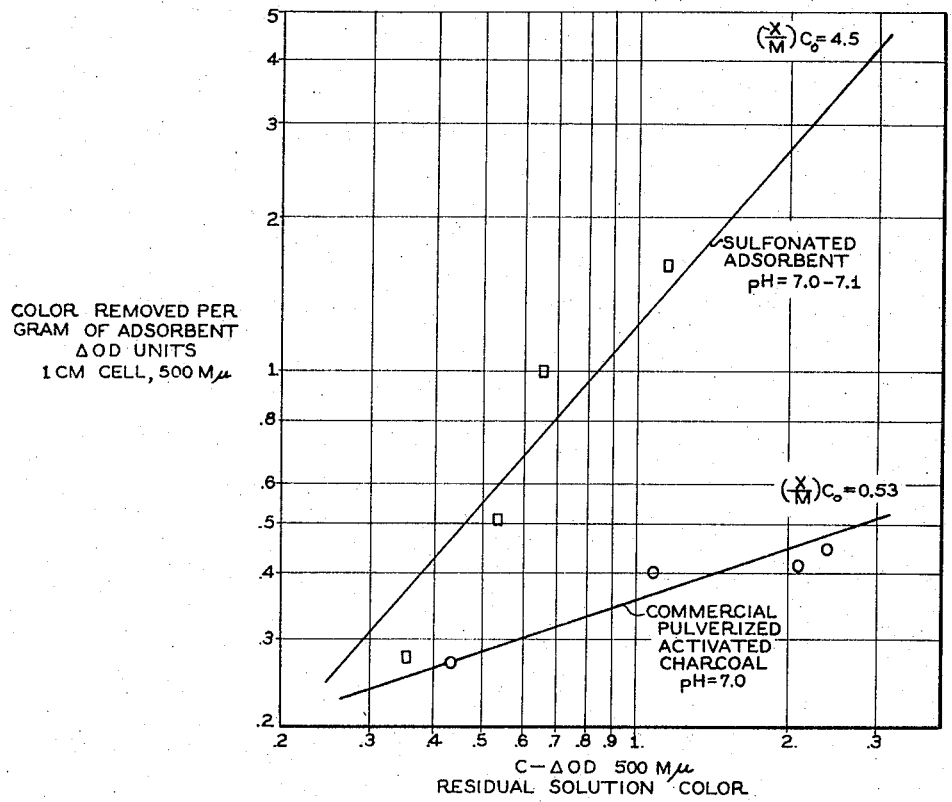
FIG. 1 is a graphic representation illustrating the efficiency or activation of activated charcoal relative to the adsorbent of the instant invention.

As will appear more fully hereinafter, the adsorbent of the instant invention is not a charcoal, being completely soluble in nitric acid. While the exact chemical structure of the adsorbent is not known, it appears to be a mixture of sulfonated and/or sulfated polymers of the cellulose type.

The raw materal of the present invention may in fact be any solid organic material having a cellulosic structure. Those found particularly useful include sawdust, ground nut shells, peat, bagasse, coffee grounds, coffee shells, and the like.

In producing the adsorbent of this invention the raw or feed stock is first heated with free water and a catalyst such as manganese sulfate or antimony trioxide to from about 110° C. to 200° C. and the corresponding pressure, but preferably to about 170° C. and 100 p.s.i.g. for about 1 to 2 hours. The upper limit of temperature in this step should be below the point at which chemical break-down or destructive distillation of the raw stock would take place. Generally, the higher the pressure the better is the porosity obtained in this initial stage. From about 1% to 20% of the catalyst and from about 15% to 200% free water, based on the dry weight of the raw or feed stock, may be used. It should be noted that although the range of free water is quite wide, the amount should not be less than 15% nor more than 200% in order to produce the adsorbent of this invention. If more than 200% water is used during sulfonation the product would hydrolyze into a soluble colloidal substance useless for the purposes of this invention; and if less than 15% water were used a charcoal-like material would be produced, also useless for the purposes of this invention.

Whenever a hard dense raw stock having a low water content such as nut shells is used, it may be desirable to employ a caustic extraction pretreatment step immediately preceding the first step described above.

Upon completion of the water-catalyst heating step pressure is relieved and the water content is reduced to the desired level by evaporation. Concentrated sulfuric acid (sp. g. 1.84) is then slowly added during gentle mixing and heat is again applied to a temperature between 130° C. and 220° C. and the corresponding pressure for from two to five hours. Since the mixture produces an exothermic reaction which would raise the temperature to approximately 130° C. little added heat is required to maintain the temperature within the desired range. A temperature higher than about 220° C. should be avoided to prevent decomposition of the product into water-soluble components. Preferably the heating should be effected under a pressure ranging between about 60 p.s.i.g. and 120 p.s.i.g. Within this pressure range sulfonation requires about one to three hours at temperatures between 185° C. and 220° C. or three to five hours at temperatures between 140° C. and 185° C.

Sulfonation may also be achieved under vacuum in the same manner as under pressure, described hereinbefore, except that a vacuum of between about 15 and 25 in Hg may be employed, and sulfonation may require about one to three hours at a temperature of about 180° C. to about 220° C. When sulfonation is carried out under vacuum, some of the water is driven off, which is a desirable result provided that the total water content is kept above 15% of the weight of the starting material.

Atmospheric sulfonation is less desirable because the end product is less adsorptive than that obtained by sulfonation under pressure or under vacuum.

Following sulfonation, the resulting solid product is filtered from the mother liquor and washed with water several times (four to six times), preferably by boiling the mixture in water for a few minutes and then filtering each time. This washing operation may be repeated until a filtrate of a desired pH is obtained, say a pH of 3.5 or higher. Sulfuric acid may be recovered from the collected mother liquor for reuse.

The sulfonated product should now be further treated to substantially increase its decolorizing power. To this end the sulfonated solids are dispersed in water and reduced in particle size by a suitable milling or homogenizing apparatus.

After milling, the material is filtered to remove excess water and then dispersed in a relatively concentrated hydrochloric acid solution (20% to 30% HCl) having a volume approximately twice that of the sulfonated adsorbent product. At this point an inert material, such as charcoal having a desired particle size, may be added to the mixture in an amount ranging from about 20% to about 50% of the dry equivalent weight of the adsorbent. The inert material provides a supporting structure for the adsorbent. The mixture is then heated to about 70° C. to 90° C., with adequate agitation, to cause the adsorbent to swell to a gel-like consistency. The material is then repeatedly filtered and washed with hot water until the desired pH of 3.5 or higher is obtained. At this stage filtration proceeds significantly more rapidly than before, and the washed adsorbent has increased its decolorizing power. Then from 5% to 50%, based on the dry weight of the sulfonated solids, of the salt of a metal, such as iron or aluminum, that will form a hydroxide gel is added to the dispersion. While the dispersion is stirred it is neutralized to a desired pH by the addition of an alkali-earth (Ca, Sr, Ba) hydroxide, after which the neutralized dispersion is filtered and the filtrate (adsorbent) rinsed with cold water. The completed adsorbent product will contain approximately 80% moisture.

That the adsorbent of the present invention is not a charcoal is demonstrated by the fact that it dissolves completely when boiled in concentrated nitric acid. Such nitric-acid solution has a deep red-orange color, which becomes yellow when diluted with water. An adsorbent derived from a sulfonation carried out in less than 15% free water, when boiled in concentrated nitric acid, forms a precipitate when diluted. A suspension in water of the instant adsorbent does not react with a solution of barium chloride. However, when a solution is barium chloride is added to a solution of the adsorbent in concentrated nitric acid, an abundant precipitate of barium sulfate forms. This nitrated compound has the following characteristics when dried:

(a) It is soluble in water and the addition of barium chloride forms no precipitate;

(b) It is soluble in methanol and produces a yellow-brown color;

(c) It is partially soluble in acetone, the insoluble residue being soluble in water; and (d) It is insoluble in chloroform, ether, carbon tetrachloride, benzene, carbon disulfide and ethanol.

The sulfonated adsorbent of the present invention has physical characteristics similar to activated charcoal, in that the color of the dried powder varies from brown to black, and the specific gravity of the dried powder is in the range of .3 to .6 gm./ml., depending upon the starting material and process steps. The adsorbent can be readily formed into briquettes, pellets, tablets and the like.

In contrast to activated charcoal, the instant adsorbent has much higher decolorizing power when wet than after it has been dried. For example, 100 gms. of the instant sulfonated adsorbent containing 80 gms. of water has the same decolorizing power as 100 gms. of the dry sulfonated adsorbent. If the moist adsorbent is dried and redispersed in the same amount of water, it does not readily regain its original decolorizing power.

The graph of FIG. 1 illustrates the relative efficiency of a commercial activated charcoal used in the sugar-refining industry against a type of the instant sulfonated adsorbent in wet form. It may there be seen that the charcoal has only 11.8% of the decolorizing power of the sulfonated adsorbent.

Figure 2:
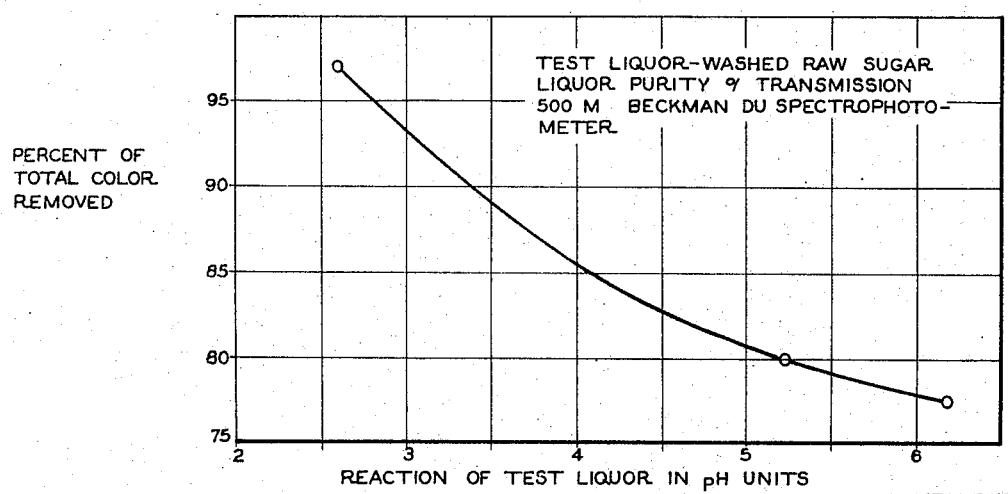
FIG. 2 is a graphic representation of percentage color removal against pH of sugar liquor decolorized by the instant adsorbent.

An additional increase in decolorizing power of the instant sulfonated adsorbent is obtained when adsorption is carried out in an acidic medium. The graph of FIG. 2 shows the effect of pH upon the decolorizing power of the sulfonated adsorbent. An increase in adsorbency of more than 20% is achieved in the pH range below 6.5.

Figure 3:
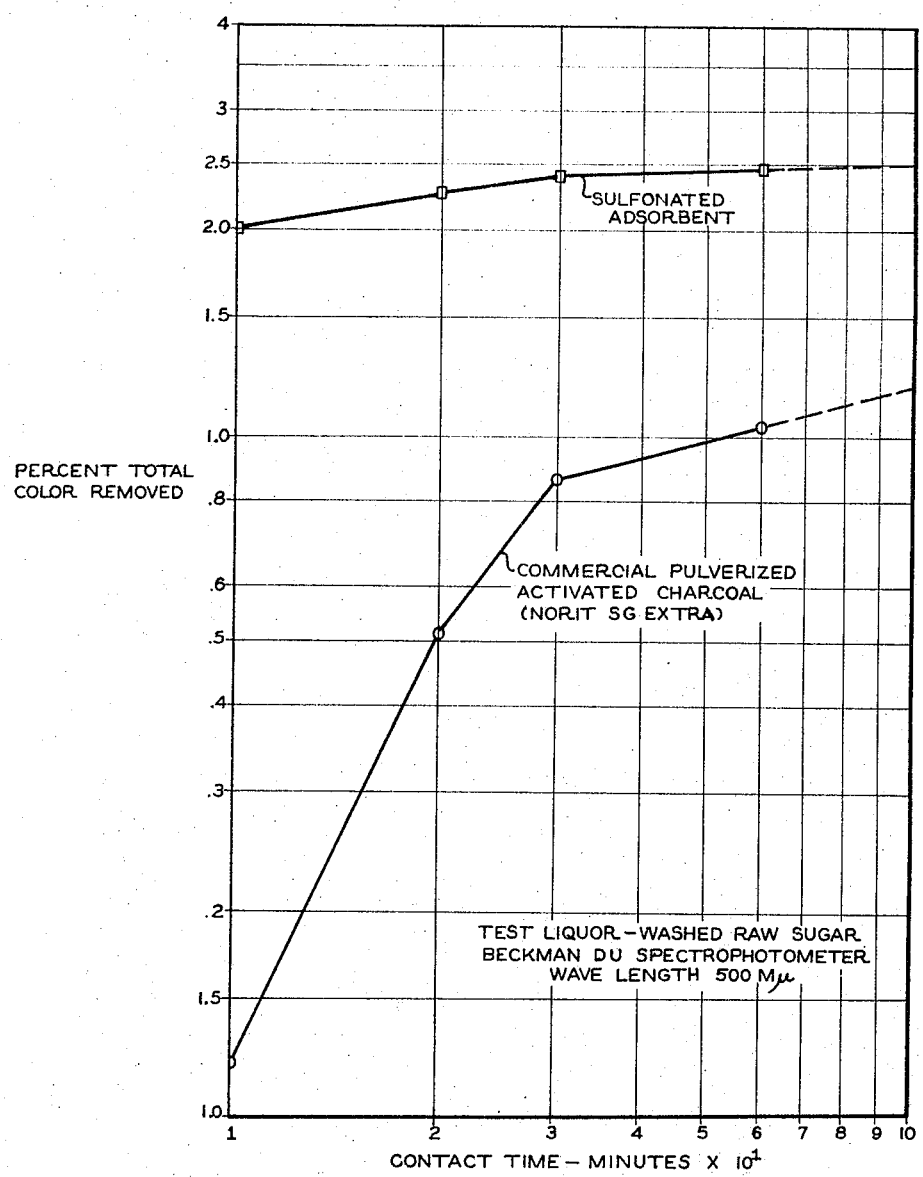
FIG. 3 is a graphic representation of the percentage decolorization against time for both commercial activated charcoal and the adsorbent of the instant invention.
Figure 4:
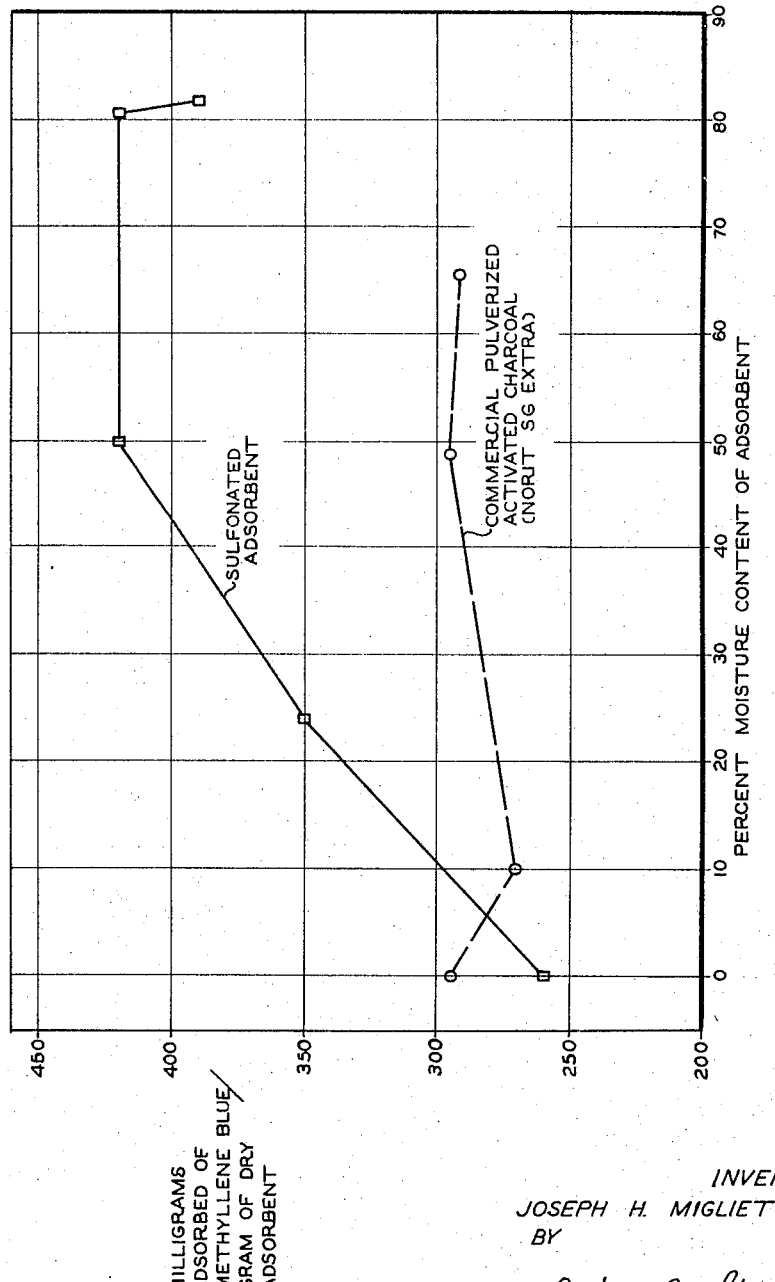
FIG. 4 is a graphic representation of decolorizing power against moisture content for both commercial activated charcoal and the adsorbent of this invention.

The graph of FIG. 3 illustrates the substantially greater decolorizing power per unit of time of the sulfonated adsorbent as compared to activated charcoal. For example, in 10 minutes of contact time the sulfonated adsorbent removes 20% of color, whereas only 1.2% of color is removed by the activated charcoal in the same time. This faster decolorization can of course save considerable time and money in commercial use.

In order to utilize the maximum adsorbability offered by the moist sulfonated adsorbent in a dry form, the moist adsorbent may be blended with a dry inert carrier or solid diluent such as pulverized wood charcoal, cellulose powder, diatomaceous earth, colloidal alumina, and others.

Also, certain liquids other than water may be added to the wet adsorbent, without impairing its original decolorizing power. This becomes essential when the sulfonated adsorbent is called upon to decolorize in a medium incompatible with water, such as oil. In such a case, the adsorbent may be filled with alcohol by repeated washing in alcohol to effectively remove the water and replace the latter with alcohol. Similarly, the adsorbent may be filled with other liquids, even water-insoluble liquids, as by the intermediate filling of the adsorbent with a liquid mutually soluble in water and the water-insoluble liquid. Thus the employment of moist adsorbent does not limit its use to water-soluble materials.

By way of illustration and with limiting intent, the following specific examples are disclosed:

EXAMPLE I

*Step No. 1.*—Mix 80 g. of sawdust with a solution consisting of 240 ml. of water and 4 g. manganese sulfate. Heat under agitation in a closed vessel until a temperature of 160° C. and the pressure of 80 p.s.i.g. are reached. Release the pressure gradually and allow some of the water to evaporate. Final water content (by difference), 94 ml. or 118% the weight of sawdust.

*Step No. 2.*—Continue agitating the mixture and add slowly 550 ml. of sulfuric acid of Sp. g. 1.84. Heat the mixture in the closed vessel to the temperature of 174° C. and pressure of 95 p.s.i.g., and maintain these conditions for one hour, release pressure and cool.

*Step No. 3.*—Decant the acid liquor from the pressure vessel and repeatedly wash the solid residue with hot water to pH 3.5.

*Step No. 4.*—Disperse the washed solids in water, mill in a Waring Blendor and then pass through a homogenizer and filter.

*Step No. 5.*—Add sufficient concentrated hydrochloric acid to cover the mixture (approximately 300 ml.) and heat to the boiling point with adequate agitation. The mixture will swell upon heating and a gel of heavy consistency will form. Repeatedly wash the gel with hot water to pH 4.0. Filtration has now become much faster than in step 4.

*Step No. 6.*—Determine total solids content and again disperse in water. To this dispersion add a solution of aluminum sulfate containing an amount of aluminum sulfate equivalent to 25% of the weight of the solids in the dispersion.

*Step No. 7.*—Continue to stir the dispersion and slowly add calcium hydroxide until a pH of 7.0–7.1 is reached.

*Step No. 8.*—Filter the dispersion and rinse the filtrate-adsorbent with cold water. The final sulfonated adsorbent will contain approximately 80% moisture.

EXAMPLE II

*Step No. 1.*—Mix 40 g. of dried paper pulp with 4 g. of manganese sulfate dissolved in 140 ml. of water. Heat to 136° C. and 29 p.s.i.g. Gradually release the pressure and allow some of the water to evaporate, until 69 ml. of water are collected. Final water content: 71 ml. or 178% of the initial weight of the dried paper pulp.

*Step No. 2.*—Continue agitating the mixture and slowly add 250 ml. of sulfuric acid (Sp. g. 1.84). Heat the mixture in the closed vessel to 203° C. and 80 p.s.i.g. Maintain these conditions for approximately one hour, then release pressure and cool. Total time for this step: 2 hours.

*Step No. 3.*—Same as step 3 of Example I.

*Step No. 4.*—Same as step 4 of Example I.

*Step No. 5.*—Add sufficient hydrochloric acid to cover the mixture (approximately 150 ml.) Then, while mixing add 8 g. (40% the equivalent dry weight of the adsorbent) of finely pulverized charcoal and heat the mixture to the boiling point. Repeatedly wash the gel formed with hot water as in the example before.

*Steps 6 to 8.*—Same as steps 6 to 8 of Example I.

From the foregoing it is apparent that this invention produces a new and improved sulfonated adsorbent by an improved simplified method and that its decolorizing power is increased as its retained moisture is increased.

It is, of course, to be understood that certain changes in method criteria may be made within the spirit of the invention and the scope of the appended claims.

I claim:

1. In a method of producing an adsorbent the steps of; providing a mixture of solid particles of organic matter of cellulosic structure, free water of at least 15% to 200% of the weight of the solid particles, and from about 1% to 20%, based on the weight of the solid particles, of a catalyst selected from the group consisting of manganese sulfate and antimony trioxide; heating the mixture to a temperature ranging between about 110° C. and 200° C. for at least one hour; adding a quantity of concentrated sulfuric acid sufficient to sulfonate the particles in said mixture; further heating the mixture to a temperature between about 130° C. and about 220° C. and a pressure between about 60 p.s.i.g. and about 120 p.s.i.g. for at least one hour; removing the acid liquor from the solid adsorbent product; reducing the particle size of the solid adsorbent product in a water suspension; adding from about 5% to 50%, based on the dry weight of the adsorbent product, of a salt of iron or aluminum that will form a hydroxide gel; neutralizing the suspension to a desired pH by adding an alkali-earth metal hydroxide; and filtering to remove the adsorbent particles from the suspension.

2. The method of claim 1 in which the excess water is removed after the particle size of the solid adsorbent product has been reduced; then hydrocholoric acid is added thereto, and the mixture is heated and then washed until a desired acidic pH has been obtained prior to the addition of the iron or aluminum salt.

3. The method of claim 2 in which the initial heating of the mixture is carried out at a pressure from about 6 p.s.i.g. to about 130 p.s.i.g.

4. The method of claim 2 in which the catalyst is manganese sulfate.

5. The method of claim 3 in which the catalyst is manganese sulfate.

6. A sulfonated adsorbent produced by the method of claim 3.

References Cited

UNITED STATES PATENTS

| | | | |
|---|---|---|---|
| 1,717,795 | 6/1929 | Marr | 162—82 |
| 2,191,060 | 2/1940 | Liebknecht | 252—179 |
| 2,191,063 | 2/1940 | Smit | 252—179 |
| 2,735,819 | 2/1956 | Goedkoop | 252—179 |

PATRICK P. GARVIN, *Primary Examiner.*

DANIEL E. WYMAN, *Examiner.*

L. G. XIARHOS, *Assistant Examiner.*